United States Patent [19]

Bailey

[11] 4,030,019

[45] June 14, 1977

[54] STATIC INVERTER CONTROL CIRCUIT

[75] Inventor: Ronald Barry Bailey, Erie, Pa.

[73] Assignee: General Electric Company, Erie, Pa.

[22] Filed: Nov. 10, 1975

[21] Appl. No.: 630,733

[52] U.S. Cl. .................................. 321/45 R; 321/11
[51] Int. Cl.² ......................................... H02M 7/515
[58] Field of Search .............................. 321/11–14, 321/45 R, 45 S, 45 C

[56] References Cited

UNITED STATES PATENTS

| 3,133,245 | 5/1964 | White | 321/45 S |
| 3,250,978 | 5/1966 | Moscardi | 321/45 C |
| 3,263,152 | 7/1966 | Walker | 321/45 C |
| 3,324,381 | 6/1967 | Bock et al. | 321/13 X |
| 3,684,936 | 8/1972 | Graf | 321/11 X |
| 3,930,194 | 12/1975 | Walker | 321/14 X |

Primary Examiner—William M. Shoop
Attorney, Agent, or Firm—J. H. Beusse

[57] ABSTRACT

Method and apparatus for effecting control of a complementary impulse commutated inverter to enable start-stop operation without power removal and to avoid start-up failures caused by inductive load flux saturation. The invention utilizes a gating logic circuit to always start inverter operation by gating a first predetermined switching element. The gating logic circuit responds to a stop command by terminating operation in a half-cycle in which the first predetermined switching element is not carrying load circuit. In one embodiment upon receipt of a stop command the gating logic circuit terminates inverter operation by applying a last gating signal to the first predetermined switching element, the last gating signal having a time duration less than that required after receipt of a gating signal for current reversal in the inductive load. The last gating pulse is effective to commutate the conducting switching element and current reversal in the load is effective to commutate the first predetermined switching element.

4 Claims, 2 Drawing Figures

STATIC INVERTER CONTROL CIRCUIT

BACKGROUND OF THE INVENTION

The present invention relates to inversion means for converting electric power from direct (DC) to alternating (AC) form and, more particularly, relates to an improved control for such inversion means.

Electronic conversion of electric power from direct current (DC) to alternating current (AC) is generically referred to as inversion and the apparatus for performing such inversion is commonly referred to as an inverter. Electric power inversion can be practically accomplished by appropriately controlling the operations of a plurality of switching elements in alternative paths of load-current conduction between DC input (source) terminals and AC output (load) terminals of an inverter. The switching elements may comprise, for example, electric valves of the type having the ability to block current conduction until turned "on" by a suitable control or gate signal. One family of such valves is generally known by the names "controlled rectifier" or "thyristor," and the invention will be described using this family for switching elements. A detailed explanation of controlled rectifiers can be found in the General Electric SCR Manual, Fifth Edition, published 1972 by the General Electric Company, Semiconductor Products Department, Syracuse, New York.

There are many different circuit configurations and operating modes for inverters wherein controlled rectifiers are used as the main switching elements. By cyclically turning on and off the respective controlled rectifiers, an AC output voltage is derived from the DC power that is applied to the inverter input terminals. Any such inverter has to include suitable means for reliably turning off each controlled rectifier at the conclusion of its prescribed interval of load-current conduction and for assuring complete transfer of current from that "outgoing" controlled rectifier to the next-conducting controlled rectifier (the "incoming" rectifier), which transfer is called "commutation."

One well-known family of inverter circuits employs "impulse commutation" and a popular sub-family of impulse commutated inverter circuits is the "complementary impulse-commutated" inverter. A detailed explanation of complementary impulse-commutated inverters is set forth in chapter 7, pages 190–208 of *The Principles of Inverter Circuits* by B. D. Bedford and R. G. Hoft, published in 1964 by John Wiley and Sons, New York, New York.

In the complementary impulse-commutated inverter, current conduction in one load-current path is terminated by the onset of current conduction in an alternate path. In other words, the outgoing controlled rectifier is commutated through the action of turning on the incoming controlled rectifier. In order to effect commutation, this type of inverter requires that the applied load as seen by the inverter by inductive, i.e., the inverter requires a lagging power factor output current so that current will continue to flow in the load even though input power is interrupted. In order to assure a lagging power factor and to isolate the inverter from the driven load, a transformer is generally employed in the output or load terminals of this type inverter.

In the use of a complementary impulse commutated inverter, a problem arises if an attempt is made to start the inverter at operating voltage levels under conditions in which the output transformer may saturate before completion of the first half-cycle of inverter operation, a half-cycle being defined as the conduction period of one of the alternate current paths. This problem may occur, for example, if inverter operation has been interrupted for such a short interval that residual flux is present in the transformer core from a previous operation and the first controlled rectifier to be gated on results in a current flow which increases the flux level in the core. If the core then saturates, the commutating capacitor will not acquire sufficient charge to effect commutation of the first controlled rectifier when the second controlled rectifier is gated on and will result in a "shoot-through," or short-circuit, on the power lines causing, at the least, fuse burn out or destruction of the controlled rectifiers.

Prior art attempts to resolve this particular problem have involved costly additions to the power circuit. One method, described in U.S. Pat. No. 3,133,241 of David E. White, has been to include in the inverter circuit an additional high power controlled rectifier and associated logic circuitry to allow presetting of the transformer flux. Steering logic then assures that the controlled rectifier which will cause flux to be generated in a direction opposite to the present flux is gated on first. The above-described method suffers from the expense of an added power semiconductor and additional components which are subject to possible failure in a power circuit.

In adition to the above-described start-up problem, termination of the operation of prior art complementary impulse-commutated inverters has required that mechanical switches be provided in order to interrupt DC power to the inverter for at least a time period sufficiently long to allow the controlled rectifiers to cease conducting. The reason for the power removal is that the controlled rectifiers, once gated into conduction, will remain conducting, even though gate pulses are no longer applied, so long as current continues to flow in the controlled rectifiers. This additional DC power interrupting capability requires that the mechanical switches be capable of interrupting what may be relatively large currents thus making the switches subject to early failure due to arcing and burning and increasing the cost and difficulty of operating an inverter.

It is an object of the present invention to provide an improved control circuit and method of control for a complementary impulse commutated inverter.

It is another object of the present invention to provide an improved control circuit and method of control for a complementary impulse commutated inverter which circuit and method negate a need for additional power semiconductors.

It is still another object of the present invention to provide an improved control circuit and method of control for a complementary impulse commutated inverter, which circuit and method provide for inverter start-stop operation without the necessity of removing power from the inverter.

SUMMARY OF THE INVENTION

In carrying out the invention in one form thereof, there is provided a starting circuit for a complementary impulse commutated inverter, which starting circuit is connected to initiate operation of the inverter in a predetermined manner. In the inverter, first and second controlled rectifiers are arranged respectively in first and second alternate current conduction paths between a source of DC power and an inductive load, commutating circuit components being connected to each of the controlled rectifiers. In the starting circuit, first and second oscillators are connected respectively to alternately supply gating signals to the first and second controlled rectifiers, conduction of the first controlled rectifier occuring in a first half-cycle and conduction of the second controlled rectifier occurring in a second half-cycle. The starting circuit includes a logic circuit connected to receive inverter ON-OFF (start-stop) commands and arranged to supply the ON-OFF commands to the oscillators in a manner to always start inverter operation by first energizing the first controlled rectifier followed by alternate energizing of both controlled rectifiers. The logic circuit is connected to respond to an inverter OFF command by terminating inverter operation only at the end of the half-cycle in which the second controlled rectifier was last conducting current. In one aspect of the invention upon receipt of an OFF command the logic circuit effects energization of the first controlled rectifier at the end of the second half-cycle for a short time interval to assure commutation of the second controlled rectifier, the time interval being sufficiently short to assure self-commutation of the first controlled rectifier.

With this arrangement operation of the inverter is always terminated at the end of the second half-cycle and is always begun at the beginning of the first half-cycle. This assures that the flux produced in the inductive load at the start of inverter operation will always be in a direction opposing the direction of flux produced during the last half-cycle of operation. In this manner the problem associated with inductive load flux saturation is avoided.

BRIEF DESCRIPTION OF THE DRAWINGS

The novel features which are believed to be characteristic of the invention are set forth with particularity in the appended claims. The invention itself, however, both as to its organization and method of operation together with other advantages and objects thereof may best be understood by reference to the following description taken in conjunction with the accompanying drawings:

DETAILED DESCRIPTION OF THE PREFERRED EMBODIMENT

Figure 1:
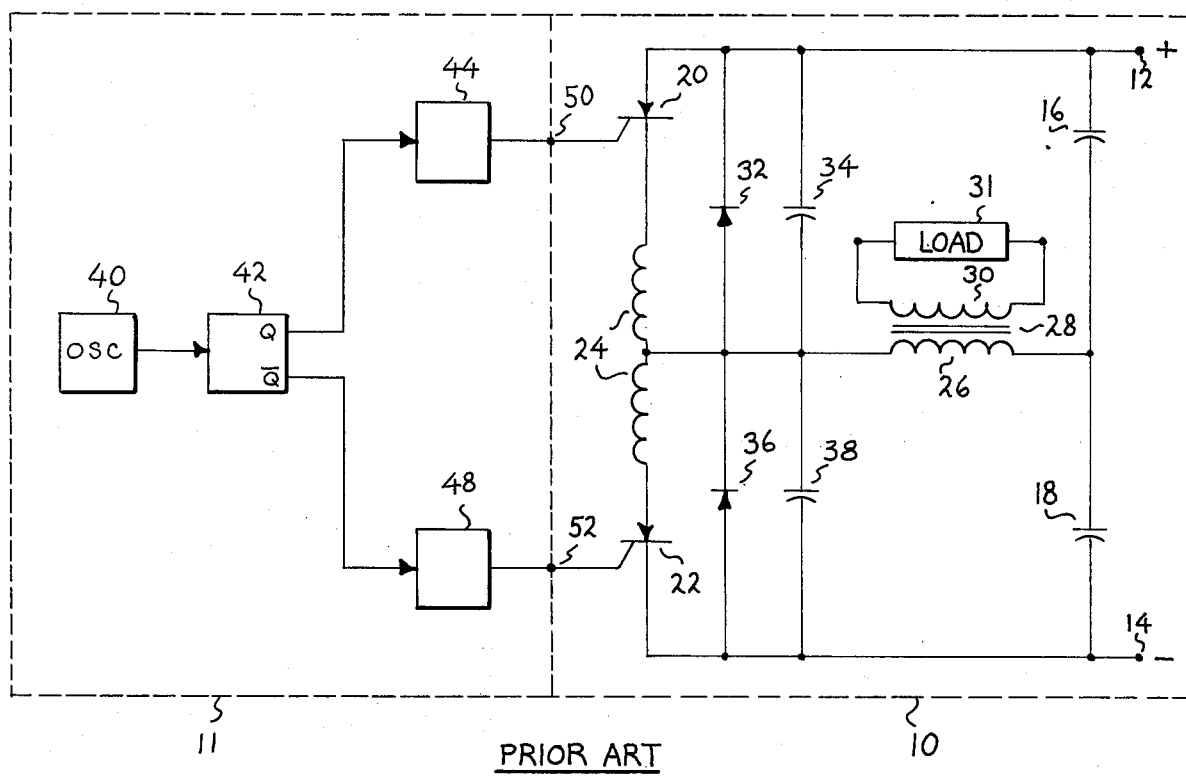
FIG. 1, in which there is shown a simplified schematic/block diagram of an inverter and associated gating logic circuit typical of the prior art.

Referring now to FIG. 1 there is shown a prior art complementary impulse commutating inverter 10 and gating logic circuit 11 for applying gating pulses to control the operation of inverter 10. Inverter 10 includes a pair of input terminals 12 and 14 arranged for connection to a source of direct current power (not shown). A pair of filter capacitors 16 and 18 are serially connected between input terminals 12 and 14, the filter capacitors acting to make the power source appear to be a center tapped power source. Conversion of the DC input power to AC output power is accomplished by means of first and second controllable switching means such as thyristors or silicon controlled rectifiers (SCR) 20 and 22. It should be noted that the SCR is a controllable electronic switch having anode, cathode and gate electrodes or terminals and is a unidirectional device in that current can be conducted only when the anode is biased at a positive voltage or potential with respect to the cathode. The conditon of the anode being at a positive potential with respect to the cathode is referred to as a forward bias or voltage, and the condition wherein the cathode is at a positive potential with respect to the anode is referred to as a reverse bias condition. When the SCR is forward biased, a signal applied to the gate terminal will cause the SCR to begin conducting current. Current conduction can then be terminated only by reducing the current below a minimum threshold or sustaining level by applying, for example, a reverse bias to the SCR. The anode of SCR 20 is connected to terminal 12 and the cathode of SCR 20 is connected to one end of a center tapped inductor 24. The opposite end of inductor 24 is connected to the anode of SCR 22, the cathode of this latter SCR being connected to terminal 14. The center tap of inductor 24 is connected to a first terminal of a primary winding 26 of an output transformer 28. A second terminal of winding 26 is connected to the junction of capacitors 16 and 18. An alternating current output is provided by the secondary winding 30 of transformer 28, to which winding 30 there is connected a load 31. The combination of transformer 28 and load 31 appears as an inductive load to inverter 10.

The SCR 22 is commutated by the action of a circuit including inductor 24, a free-wheeling diode 32, and a capacitor 34 connected in parallel with diode 32. The anode of diode 32 is connected to the center tap of inductor 24 and the cathode of diode 32 is connected to the anode of SCR 20. The circuit for commutating SCR 20 includes inductor 24, a diode 36, and a capacitor 38 connected in parallel with diode 36, diode 36 having its anode connected to the cathode of SCR 22 and its cathode connected to the center tap of inductor 24.

The prior art gating logic circuit 11 includes a continuously running clock oscillator 40 whose frequency of oscillation is determinative of the AC output frequency of inverter 10. An output terminal of oscillator 40 is connected to a clock input terminal of a flip-flop 42 of a type which changes its output state upon receipt of a clock signal. Flip-flop 42 includes a Q output terminal and an inverted or $\bar{Q}$ output terminal. The Q output terminal is connected to an enable terminal of an oscillator such as an astable multivibrator 44 and the $\bar{Q}$ output terminal is connected to an enable terminal of an oscillator such as an astable multivibrator 48. An output terminal of multivibrator 44 is connected to an output terminal 50 of circuit 11, to which output terminal 50 is connected the gate terminal of SCR 20. An output terminal of multivibrator 48 is connected to an output terminal 52 of circuit 11, to which terminal 52 is connected the gate terminal of SCR 22.

Operation of inverter 10 and its controls are well known in the art (see, for example, U.S. Pat. No. 3,866,098 - Weiser, granted on Feb. 11, 1975, and assigned to the General Electric Company), and, assuming no residual flux in transformer 28, proceeds as follows: power is applied to both the logic circuit 11 and the inverter 10. Oscillator 40 begins functioning and supplies clock pulses to flip-flop 42 causing flip-flop 42 to alternately produce periodic high level and low level signals at the Q and $\bar{Q}$ output terminals. As is well known when the Q output terminal is at a high level, the $\bar{Q}$ output terminal is at a low level and vice versa. The time duration of a single high level (or a single low level) signal from flip-flop 42 normally extends from the receipt of one clock pulse to the receipt of the next succeeding clock pulse. A signal having a time duration extending from one clock pulse to the next succeeding clock pulse is referred to as a signal of normal duration. Upon receipt of a high level signal, multivibrators 44 and 48 each produce a series of gate pulses, the series continuing until the high level signal is replaced by a low level signal. Since the output terminals of multivibrators 44 and 48 are connected respectively to output terminals 50 and 52 and thus to the gate terminals of SCR's 20 and 22, the SCR's are alternately supplied with trains of gating pulses. The pulses in each train recur at relatively high frequency such that each multivibrator 44 or 48 supplies a plurality of gating pulses throughout the normal time duration of a high level signal from flip-flop 42 in effect forming a single gating signal for the associated SCR. Thus a gating signal represents the envelope of a train or series of gating pulses having a normal time duration equivalent to the normal time duration of a single high level signal from flip-flop 42. It should be noted that since flip-flop 42 changes state on each clock pulse from oscillator 40, the resulting gating signals for each SCR 20 and 22 are supplied at one-half the frequency of oscillator 40.

Since power is available at terminals 12 and 14, as the gating pulses are applied to the gate electrode of SCR 20, the SCR is energized or triggered and begins conducting thus allowing current to flow from terminal 12 through SCR 20, the upper half of inductor 24, primary winding 26 of transformer 28 and then through capacitor 18 to terminal 14. Before capacitor 18 has had an opportunity to attain a significant charge, flip-flop 42 changes state thereby terminating gate pulses to SCR 20 and causing gate pulses to be applied to the gate electrode of SCR 22. During the current conducting time of SCR 20, capacitor 38 charges to essentially the full DC input voltage and when SCR 22 begins conducting the voltage on capacitor 38 is placed across the lower half of inductor 24. The two halves of inductor 24 are tightly coupled, generally by bifilar winding techniques, so that the voltage across the lower half of inductor 24 is impressed with approximately 95% efficiency across the upper half of inductor 24. This voltage effectively reverse biases the SCR 20 since the cathode is raised above the anode voltage and SCR 20 is rendered non-conductive. Energy trapped in the lower half of the inductor 24 at the completion of commutation is dissipated by circulation through SCR 22, diode 36 and inductor 24. It should also be noted that because of the inductive nature of the load applied to the inverter, the direction of current flow through winding 26 cannot change instantaneously and a short time interval occurs before current reverses in winding 26. For this reason there exists a short period of time just following commutation of SCR 20 during which time current flow traverses an alternate path. In this instance the alternate path is from terminal 12 through capacitor 34, winding 26, and capacitor 18 to terminal 14 until capacitor 34 has charged and capacitor 38 has discharged. The current then momentarily flows from terminal 14 through diode 36 and winding 26. The current flowing during this interval through diode 36 causes a very low voltage potential to appear across the inductor 24 and SCR 22 combination, and because of the voltage appearing on inductor 24, causes SCR 22 to be reverse biased and non-conducting. Thus an interval exists just after commutation in which both SCR 20 and SCR 22 are non-conducting, and gating pulses must continue to be applied or must be reapplied to SCR 22 when the interval has passed in order to enable the SCR 22 current path. However, the gating pulses may be terminated after this interval has expired and the SCR 22 will continue to conduct current until SCR 20 is rendered conductive or until power is removed from the circuit.

At the end of the first complete cycle of operation the gate pulses to SCR 22 are terminated and gate pulses are applied to SCR 20. At this time capacitor 34 has been charged and is discharged through the upper half of inductor 24 to thereby impress a large voltage across the lower half of inductor 24 which is effective to reverse bias SCR 22 and cause it to cease conducting. The energy trapped in the upper half of inductor 24 is circulated through diode 32 and SCR 20 and dissipated in the $I^2R$ losses of inductor 24. As with SCR 22 gate pulses must be applied to SCR 20 until current through winding 26 drops to zero so that current reversal may occur. In this manner, the SCR's 20 and 22 alternately conduct current from the DC power source in alternating directions through the primary winding 26 of transformer 28 to thereby provide an alternating current output from secondary winding 30. In the prior art system as illustrated in FIG. 1, it is necessary to remove the DC power source in order to terminate inverter operation.

When operation of both SCR 20 and SCR 22 is terminated significant residual flux may remain in transformer 28. Although given sufficient time this flux will dissipate under normal conditions, it is often required that the inverter start and stop operations at frequent intervals thus precluding dissipation of the residual flux. If SCR 20, for example, begins conducting at any time when significant residual flux remains in transformer 28 such that the additional flux created by current flowing from SCR 20 through primary winding 26 is effective to saturate transformer 28, less energy will be stored in capacitor 38 because of the low voltage across primary winding 26 and this lower energy level will be insufficient to enable commutation of SCR 20 when SCR 22 begins conducting. Even if the energy level in capacitor 38 did reach a commutating level, the increase in current due to transformer saturation may reach a level in excess of the commutating capability of SCR 22, capacitor 38 and inductor 24. This will then result in both SCR 22 and SCR 20 being conductive during the next half-cycle and will effectively place a short circuit across terminals 12 and 14. The short circuit will result in either blowing of fuses or in destruction of the SCR's 20 and 22 or in destruction of the DC power supply powering the inverter circuit.

Figure 2:
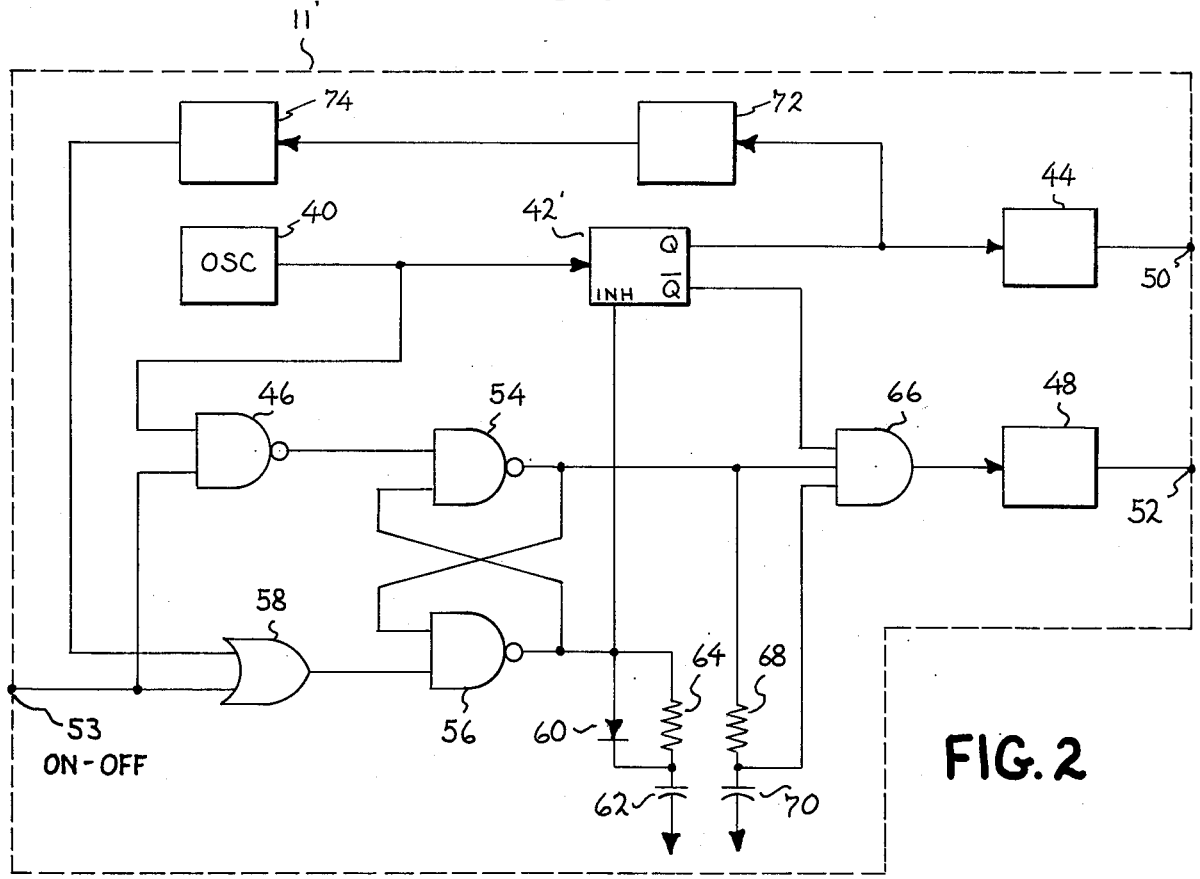
FIG. 2, in which there is shown a schematic/block diagram of an inverter gating logic circuit in accordance with the present invention.

Referring now to FIG. 2, in which like numbers refer to corresponding components of FIG. 1, there is shown a logic circuit 11' according to the present invention which avoids the load saturation problem of the prior art and which also provides a method for inverter start-stop operation without the necessity of interruption of the DC power source. Logic circuit 11' includes an input terminal 53 connected to receive inverter start-stop or ON-OFF commands and further includes output terminals 50 and 52 for supplying gating pulses to SCR's 20 and 22. Although it will become apparent to those skilled in the art that a multiplicity of logic circuits may be derived which will function in accordance with the present invention, the embodiment shown in FIG. 2 has been found to be a reliable and economical circuit for developing gating pulses in a predetermined order in response to start-stop input command signals. Logic circuit 11' includes clock oscillator 40 of a free running type well known in the art having an output terminal connected to an input terminal of flip-flop 42' and also to a first input terminal of a NAND gate 46. A second input terminal of NAND gate 46 is connected to input terminal 53, the output terminal of NAND gate 46 being connected to a first input terminal of a NAND gate 54. NAND gate 54 is one-half of a NAND latch circuit comprising gate 54 and a NAND gate 56. Input terminal 53 is also connected to a first input terminal of an OR gate 58, the output terminal of OR gate 58 being connected to an input terminal of NAND gate 56. For latching purposes the output terminals of NAND gate 54 and NAND gate 56 are cross-coupled into input terminals of each other as is well known.

In order to enable flip-flop 42' the output terminal of NAND gate 56 is also connected through a delay circuit to an inhibit terminal of flip-flop 42'. The delay circuit connected to NAND gate 56 comprises a diode 60 having its anode connected to the output terminal of NAND gate 56 and its cathode connected to one terminal of a capacitor 62, the other terminal of capacitor 62 being connected to a ground potential. A resistor 64 is connected in parallel with diode 60 in order to provide a current sinking path when the output signal from NAND gate 56 is at a low voltage level. Capacitor 62 is charged at a controlled rate by virtue of the charging path through diode 60.

Gating pulses to SCR 22 are provided by astable multivibrator 48, which multivibrator is enabled by the combination of signals from a $\bar{Q}$ output terminal of flip-flop 42' and an output terminal of NAND gate 54. For this enabling purpose, the $\bar{Q}$ output terminal of flip-flop 42' is connected to a first input terminal of an AND gate 66, and the output terminal of NAND gate 54 is connected to a second input terminal of AND gate 66. A third input terminal of AND gate 66 is connected to the output terminal of NAND gate 54 through a delay circuit comprising a series combination of a resistor 68 and a capacitor 70. The resistor 68 and capacitor 70 combination is connected between the output terminal of NAND gate 54 and a reference ground potential with the third input terminal of AND gate 66 connected to the junction intermediate resistor 68 and capacitor 70. An output terminal of AND gate 66 is connected to an enabling terminal of multivibrator 48 to thereby enable multivibrator 48 when all input signals to AND gate 66 are at a logic 1 level.

Gating pulses to SCR 20 are provided by astable multivibrator 44 which multivibrator is gated by a signal from the Q output terminal of flip-flop 42', i.e., the Q output terminal of flip-flop 42' is connected to an enabling terminal of multivibrator 44. For reasons to become apparent, the Q output terminal of flip-flop 44 is connected through first and second monostable multivibrators 72 and 74, respectively, to a second input terminal of OR gate 58.

In the operation of the above-described logic circuit, when an ON command is received at terminal 53, an ON command being evidenced by a logic 1 signal, the signal is applied to one input terminal of NAND gate 46 and when the next clock pulse from oscillator 40 is applied to the second input terminal of gate 46, a logic 0 signal is produced at the output terminal of gate 46. The logic 0 signal from gate 46 forces NAND gate 54 to produce a logic 1 signal. At the same time the logic 1 ON command at terminal 53 is applied through OR gate 58 to force a logic 1 signal to be applied to the corresponding input terminal of NAND gate 56. Since the output of NAND gate 54 is at a logic 1 level, both inputs to NAND gate 56 are now at logic 1 levels and the output of NAND gate 56 goes to a logic 0 level. This signal, when fed back into the second input terminal of NAND gate 54, latches the output of NAND gate 54 at a logic 1 level. The logic 0 signal at the output of NAND gate 56 removes the inhibit command from flip-flop 42' such that on the next clock pulse from oscillator 40 the Q output of flip-flop 42' goes to a logic 1 level. Since multivibrator 44 is enabled by a logic 1 signal, multivibrator 44 immediately begins oscillating and supplying gating pulses to SCR 20. On the next clock pulse from oscillator 40 the $\bar{Q}$ output of flip-flop 42' goes to a logic 1 level and the Q output goes to a logic 0 level. This results in enabling of multivibrator 48 and disabling of multivibrator 44. Gating pulses are now applied to SCR 22 and terminated to SCR 20 thereby causing the inverter 10 to commutate SCR 20. The operation of inverter 10 is thus begun by initially supplying a first gating signal, or train of gating pulses, to SCR 20 and thereafter supplying gating signals alternately to SCR 20 and 22. So long as the inverter ON command is at a logic 1 level, flip-flop 42' continues to change state on every clock pulse thereby alternately enabling multivibrator 44 and multivibrator 48 to cause alternate firing of SCR 20 and SCR 22.

Upon receipt of an inverter OFF command or logic 0 signal at terminal 53, the output of NAND gate 46 goes to a logic 1 level. When the Q output of flip-flop 42' goes to a logic 1 level, monostable multivibrator 72 is triggered and provides a logic 0 signal to multivibrator 74 for a timed interval less than the normal time duration between clock pulses. This interval is chosen to be of a subnormal time duration which is sufficient to provide initial gating of SCR 20 in order to commutate SCR 22 but is less than the time interval required after application of a gating signal for current to reverse in winding 26. When the output of multivibrator 72 reverts to a logic 1 level, multivibrator 74 is triggered and provides a logic 0 signal for a timed interval. Since the output of multivibrator 74 is connected to an input terminal of OR gate 58, both input signals to OR gate 58 are now at logic 0 levels and the output of OR gate 58 goes to a logic 0 level. The logic 0 signal at the output of OR gate 58 is applied to NAND gate 56 forcing the output of NAND gate 56 to a logic 1 level. This in turn forces the output of NAND gate 54 to a logic 0 level. The logic 0 at the output of NAND gate 54 immediately inhibits AND gate 66 and multivibrator 48 to prevent any further gating pulses from being applied to SCR 22. The inhibit signal is immediately applied to flip-flop 42' when the output signal from NAND gate 56 goes to a logic 0 level thereby forcing flip-flop 42' into an inhibited state wherein the Q output is at a logic 0 level and the $\bar{Q}$ output is at a logic 1 level. In this manner a last gating signal of subnormal duration is utilized to terminate operation of inverter 10.

During inverter operation there are two possible states of inverter 10, one in which SCR 20 is on and SCR 22 is off and the other in which SCR 22 is on and SCR 20 is off. Assuming a first state, I.E., with SCR 20 on and SCR 22 off, and further assuming that SCR 20 has been on for a time longer than the combined delay times of multivibrators 72 and 74, when the inverter 'OFF' command is received the remainder of the normal gating signal is completed to SCR 20, a normal gating signal is then applied to SCR 22 and finally a single narrow gating signal is applied to SCR 20 to thereby assure that SCR 20 is the last SCR to fire. The last pulse turns on SCR 20 which commutates off SCR 22 and transfers load current to diode 32. Had SCR 20 been in a conducting state for a time period less than the combined delay times of multivibrators 72 and 74 when the OFF command was received, removal of gating pulses and turn-off of the inverter operation would have occurred during the delay time of multivibrator 74. Referring to FIG. 2, it can be seen that when the Q output of flip-flop 42' goes to a logic 1 level and enables multivibrator 44, the logic 1 signal causes multivibrator 72 to produce a single pulse of predetermined time duration. The trailing edge of the single pulse from multivibrator 72 triggers multivibrator 74 causing this latter multivibrator to produce a single output pulse of predetermined time duration. Since the normal output level of multivibrator 74 is a logic 1 level, the output pulse is a logic 0 pulse. Thus it can be seen that only during the time period of the logic 0 pulse from multivibrator 74 will the logic 0 OFF command be effective to change the output stage of OR gate 52. For this reason if the OFF command is received after multivibrator 74 has reverted to a logic 1 output state, it becomes necessary for the logic circuitry, and hence the inverter, to go through enough of a complete cycle as is required to generate another logic 0 output pulse from multivibrator 74.

It should be noted that the duration of the last gating pulse produced by the time delay of multivibrator 72 is sufficiently short to be removed from the gating terminal of SCR 20 prior to the time at which the current reversal through winding 26 would eventually occur, the current reversal being caused by the lagging nature of the load circuit. Thus when the current reverses, or more accurately, when it reaches the next zero crossing, load current is extinguished and cannot flow through SCR 20 which has already been turned off by the reverse bias due to the forward drop of diode 32 and which SCR cannot be retriggered in the absence of gating pulses. The action of the circuit in the event that SCR 22 is conducting and SCR 20 is off when a stop command is received is similar to the above operation except that no additional pulses are applied to SCR 20 other than the single short duration pulse. In this latter case the gating pulses to SCR 22 would be completed and then the last subnormal gating signal would be applied to SCR 20 thereby assuring that SCR 20 turns on just long enough to commutate off the SCR 22 and that thereafter no further gating signals are applied to either thyristor. In this manner the logic circuit assures that under any conditions of inverter start-stop operation it is always known which SCR is last to conduct load current, and thus the polarity of residual flux in transformer 28 is always known. Since the logic circuitry always initiates operation of the inverter by first initiating conduction of SCR 20 the problems associated with saturation of transformer 28 are eliminated.

While the principles of the invention have now been made clear in an illustrated embodiment there will be immediately obvious to those skilled in the art many modifications, constructions and arrangements used in the practice of the invention which are particularly adapted for specific environments and operating requirements without departing from those principles. The appended claims are therefore intended to cover and embrace any such modifications, subject only to the limits of the true spirit and scope of the invention.

What I claim as new and desire to secure by Letters Patent of the United States is:

1. In a complementary impulse commutated inverter circuit of the type including first and second controllable switching means connected in alternate load current carrying paths between a DC power source and an inductive load, an improved control circuit including means for producing gating signals having a predetermined normal time duration, said control circuit having first and second output terminals and an input terminal, said first and second output terminals being connected to control terminals of said controllable switch means, said input terminal being connected to receive an inverter enable command signal said control circuit comprising:

a. means responsive to said enable command signal for initially supplying a first gating signal to a predetermined one of said controllable switching means and for thereafter supplying subsequent gating signals alternately to both of said controllable switching means;

b. means responsive to the removal of said enable command signal for causing a last gating signal to be applied to said predetermined one of said controllable switching means; and c. means for prematurely terminating said last gating signal so that said last gating signal is of a subnormal duration.

2. The invention as defined in claim 1 wherein termination of said gating signals is accomplished such that the last gating signal is of a time duration shorter than that required after receipt of said last gating signal for current reversal in said load.

3. A control circuit for a complementary impulse commutated inverter of the type including first and second controllable switching means arranged respectively in first and second alternate load current conduction paths between a source of DC power and an inductive load, commutating circuit components being connected to each of said controllable switching means, said control circuit comprising:

a. first and second oscillators connected respectively to alternately supply gating signals to said first and second controllable switching means, conduction of said first controllable switching means occuring in a first half-cycle and conduction of said second controllable switching means occuring in a second half-cycle;

b. a logic circuit connected to receive inverter enable commands and arranged to supply said enable commands to said first and second oscillators in a manner to always start inverter operation by first gating said first controllable switching means followed by alternate gating of both of said controllable switching means, said logic circuit also being connected to respond to an inverter disable command by gating said first controllable switching means for a time interval sufficient to assure commutation of the second controllable switching means, said time interval being sufficiently short to allow self-commutation of said first controllable switching means, thereby terminating inverter operation only at the end of the half-cycle in which the second controllable switching means was last conducting load current.

4. A method for preventing saturation of an inductive load in a complementary impulse commutated inverter of the type including at least first and second controllable switching means and a source of gating signals, said method comprising the steps of:
 a. supplying a first gating signal to the first controllable switching means and thereafter supplying subsequent gating signals alternately to said first and second controllable switching means;
 b. supplying a last gating signal to the first controllable switching means; and
 c. terminating said last gating signal such that the time duration of said last gating signal is less than the time required for current reversal in the inductive load.

* * * * *